(12) United States Patent
Wang et al.

(10) Patent No.: US 9,288,306 B2
(45) Date of Patent: Mar. 15, 2016

(54) METHOD FOR PROCESSING USER INFORMATION, MOBILE TERMINAL, AND SERVER

(71) Applicant: Huawei Technologies Co., Ltd., Shenzhen, Guangdong (CN)

(72) Inventors: Liangwei Wang, Shenzhen (CN); Gong Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/341,311

(22) Filed: Jul. 25, 2014

(65) Prior Publication Data

US 2015/0031312 A1 Jan. 29, 2015

(30) Foreign Application Priority Data

Jul. 29, 2013 (CN) .......................... 2013 1 0323861

(51) Int. Cl.
*H04M 3/42* (2006.01)
*H04M 1/725* (2006.01)
(Continued)

(52) U.S. Cl.
CPC .......... *H04M 1/72569* (2013.01); *H04L 67/22* (2013.01); *H04M 1/72572* (2013.01); *H04W 4/028* (2013.01)

(58) Field of Classification Search
CPC .............. H04L 67/22; H04M 1/72569; H04M 1/72572; H04W 4/028; A61K 2800/591; A61K 35/66; A61K 36/185; A61K 45/06; A61K 8/97; A61K 9/0014

USPC .......... 455/73, 435.1, 456.1, 566, 512, 404.2; 702/104, 187; 709/220, 223, 224; 701/537, 1; 706/12, 21, 52; 726/26; 715/835; 719/313
See application file for complete search history.

(56) References Cited

U.S. PATENT DOCUMENTS 8,624,725 B1 * 1/2014 MacGregor .............. 340/539.13
2001/0030624 A1 * 10/2001 Schwoegler ............ G01W 1/10
342/357.52
(Continued)

FOREIGN PATENT DOCUMENTS

CN 100545658 C 9/2009
CN 101989127 A 3/2011
WO WO 2012/037725 A1 3/2012

OTHER PUBLICATIONS

Daniele Riboni, et al., "COSAR: hybrid reasoning for context-aware activity recognition", Personal and Ubiquitous Computing, vol. 15, No. 3, Aug. 14, 2010, p. 271-289.

*Primary Examiner* — Tan H Trinh

(57) ABSTRACT

Embodiments of the present invention disclose a method for processing user information, a mobile terminal, and a server. The method includes: collecting, by a mobile terminal, terminal information; obtaining prior probability information of different types of user activities at current time and in the position; and recognizing or forecasting, according to the prior probability information and the terminal information, an activity of a terminal user using the mobile terminal. In the embodiments of the present invention, during the recognition or the forecast, the number of data samples increases, and therefore accuracy of the recognition or the forecast is improved; in addition, a difference between information that is pushed to the terminal user by applying a recognition or forecast result in the embodiments of the present invention and information in which the user is interested is comparatively small, and therefore terminal using experience of the user can be improved.

14 Claims, 7 Drawing Sheets

(51) Int. Cl.
*H04L 29/08* (2006.01)
*H04W 4/02* (2009.01)

(56) References Cited

U.S. PATENT DOCUMENTS

| | | | |
|---|---|---|---|
| 2004/0033814 A1* | 2/2004 | Azuma | 455/558 |
| 2005/0059412 A1* | 3/2005 | Hosokawa | 455/456.1 |
| 2005/0154598 A1* | 7/2005 | Kanayama et al. | 705/1 |
| 2006/0284979 A1* | 12/2006 | Clarkson | 348/143 |
| 2009/0029702 A1* | 1/2009 | Shen | 455/435.1 |
| 2009/0276700 A1* | 11/2009 | Anderson et al. | 715/700 |
| 2010/0299757 A1* | 11/2010 | Lee | 726/26 |
| 2011/0029465 A1* | 2/2011 | Ito et al. | 706/12 |
| 2011/0047510 A1* | 2/2011 | Yoon | 715/835 |
| 2012/0015693 A1* | 1/2012 | Choi et al. | 455/566 |
| 2012/0176376 A1* | 7/2012 | Kim et al. | 345/419 |
| 2012/0254100 A1* | 10/2012 | Grokop et al. | 706/52 |
| 2013/0013776 A1* | 1/2013 | Tajima | 709/224 |
| 2013/0084882 A1* | 4/2013 | Khorashadi et al. | 455/456.1 |
| 2013/0144471 A1* | 6/2013 | Min et al. | 701/2 |
| 2013/0151151 A1* | 6/2013 | Jeong et al. | 701/537 |
| 2013/0173764 A1* | 7/2013 | Kami | 709/220 |
| 2013/0179108 A1* | 7/2013 | Joseph et al. | 702/104 |
| 2013/0232256 A1* | 9/2013 | Lee et al. | 709/224 |
| 2013/0246600 A1* | 9/2013 | Ohnishi | 709/223 |
| 2014/0040905 A1* | 2/2014 | Tsunoda et al. | 718/103 |
| 2014/0162706 A1* | 6/2014 | Daly | H04W 4/12 455/466 |
| 2014/0162715 A1* | 6/2014 | Pak et al. | 455/512 |
| 2014/0337861 A1* | 11/2014 | Chang et al. | 719/313 |

* cited by examiner

METHOD FOR PROCESSING USER INFORMATION, MOBILE TERMINAL, AND SERVER

CROSS-REFERENCE TO RELATED APPLICATIONS

This application claims priority to Chinese Patent Application No. 201310323861.9, filed on Jul. 29, 2013, which is hereby incorporated by reference in its entirety.

TECHNICAL FIELD

The present invention relates to the field of communications technologies, and in particular, to a method for processing user information, a mobile terminal, and a server.

BACKGROUND

As mobile terminals become more intelligent and popular, use of intelligent terminals is closely related to daily life of terminal users. In view of this, various application functions of the terminals are also gradually enhanced. Various application data of a user can be obtained by configuring an apparatus, such as a sensor, within the terminal; and a user activity can be recognized or forecasted according to these application data. Therefore, information is pushed to the user according to a forecast result, so as to improve using experience of the terminal user.

In the prior art, during recognition or forecast of a user activity, only application data of the terminal user can be collected by using a sensor, and the application data is matched to a preset activity classification model, thereby implementing recognition or forecast of the user activity. However, because an existing recognition or forecast manner is applicable to only application data of the user, where the number of data samples is limited, a recognition or forecast result is inaccurate, and a difference between information that is pushed to the user according to the recognition or forecast result and information in which the user is interested is comparatively large. As a result, using experience of the terminal user is not good.

SUMMARY

Embodiments of the present invention provide a method for processing user information, a mobile terminal, and a server, so as to resolve, to a certain extent, a problem in the prior art that an inaccurate recognition and forecast result of a user activity causes poor terminal using experience of a user.

To solve the technical problem, the embodiments of the present invention disclose the following technical solutions:

According to a first aspect, a method for processing user information is provided, where the method includes:

collecting, by a mobile terminal, terminal information, where the terminal information includes a position of the mobile terminal;

obtaining prior probability information of different types of user activities at current time and in the position; and recognizing or forecasting, according to the prior probability information and the terminal information, an activity of a terminal user using the mobile terminal.

With reference to the first aspect, in a first possible implementation manner of the first aspect, the terminal information includes: terminal sensing information and user operation information, where the terminal sensing information includes the position of the mobile terminal; and the collecting, by a mobile terminal, terminal information includes:

collecting, by the mobile terminal, the terminal sensing information and the user operation information based on a set time period; or collecting, by the mobile terminal, the terminal sensing information and the user operation information when receiving a collect command input by the terminal user.

With reference to the first aspect or the first possible implementation manner of the first aspect, in a second possible implementation manner of the first aspect, the obtaining prior probability information of different types of user activities at current time and in the position includes:

sending, by the mobile terminal, the collected position of the mobile terminal to a server, so that the server queries a human activity distribution database according to the current time and the position, so as to obtain the prior probability information of different types of user activities; and receiving the prior probability information of different types of user activities that is returned by the server.

With reference to the first aspect, the first possible implementation manner of the first aspect, or the second possible implementation manner of the first aspect, in a third possible implementation manner of the first aspect, the recognizing or forecasting, according to the prior probability information and the terminal information, an activity of a terminal user using the mobile terminal includes:

inputting the prior probability information and the terminal information to a pre-trained user activity classification model and training the user activity classification model by using a preset algorithm, so as to obtain an activity recognition result of the terminal user; or inputting the prior probability information and the terminal information to a pre-trained user activity forecast model and training the user activity forecast model by using a preset algorithm, so as to obtain an activity forecast result of the terminal user.

With reference to the third possible implementation manner of the first aspect, in a fourth possible implementation manner of the first aspect, the method further includes:

reporting, by the mobile terminal, activity information of the terminal user to the server based on a preset time period, so that the server updates the user activity classification model and the user activity forecast model according to the activity information; and receiving the updated user activity classification model and user activity forecast model that are returned by the server.

According to a second aspect, a method for processing user information is provided, where the method includes:

receiving, by a server, terminal information collected by a mobile terminal, where the terminal information includes a position of the mobile terminal;

obtaining prior probability information of different types of user activities at current time and in the position; and sending the prior probability information of different types of user activities to the mobile terminal, so that the mobile terminal recognizes or forecasts, according to the prior probability information and the terminal information, an activity of a terminal user using the mobile terminal.

With reference to the second aspect, in a first possible implementation manner of the second aspect, the terminal information includes: terminal sensing information and user operation information, where the terminal sensing information includes the position of the mobile terminal; and the obtaining prior probability information of different types of user activities at current time and in the position includes: querying, by the server, a human activity distribution database according to the current time and the position of the mobile terminal, so as to obtain the prior probability information of different types of user activities.

With reference to the first possible implementation manner of the second aspect, in a second possible implementation manner of the second aspect, the method further includes:

acquiring, by the server, human activity information from network information;

performing classification statistics on the human activity information, so as to obtain probability information of different user activities at different time and in different positions; and storing the probability information as a prior probability of a user activity in the human activity distribution database.

With reference to the second aspect, the first possible implementation manner of the second aspect, or the second possible implementation manner of the second aspect, in a third possible implementation manner of the second aspect, the method further includes:

receiving, by the server, activity information of the terminal user, which is reported by the mobile terminal based on a preset time period;

updating the user activity classification model and the user activity forecast model according to the activity information; and delivering the updated user activity classification model and user activity forecast model to the mobile terminal.

According to a third aspect, a mobile terminal is provided, where the mobile terminal includes:

a collecting unit, configured to collect terminal information, where the terminal information includes a position of the mobile terminal;

an obtaining unit, configured to obtain prior probability information of different types of user activities at current time and in the position; and a processing unit, configured to recognize or forecast, according to the prior probability information obtained by the obtaining unit and the terminal information collected by the collecting unit, an activity of a terminal user using the mobile terminal.

With reference to the third aspect, in a first possible implementation manner of the third aspect, the terminal information collected by the collecting unit includes: terminal sensing information and user operation information, where the terminal sensing information includes the position of the mobile terminal; and the collecting unit is specifically configured to collect the terminal sensing information and the user operation information based on a set time period; or collect the terminal sensing information and the user operation information when receiving a collect command input by the terminal user.

With reference to the third aspect or the first possible implementation manner of the third aspect, in a second possible implementation manner of the third aspect, the obtaining unit includes:

an information sending subunit, configured to send the position of the mobile terminal collected by the collecting unit to a server, so that the server queries a human activity distribution database according to the current time and the position, so as to obtain prior probability information of different types of user activities; and a probability receiving subunit, configured to receive the prior probability information of different types of user activities that is returned by the server.

With reference to the third aspect, the first possible implementation manner of the third aspect, or the second possible implementation manner of the third aspect, in a third possible implementation manner of the third aspect, the processing unit includes at least one of the following subunits:

an activity recognizing subunit, configured to input the prior probability information and the terminal information to a pre-trained user activity classification model, and train the user activity classification model by using a preset algorithm, so as to obtain an activity recognition result of the terminal user; and an activity forecast subunit, configured to input the prior probability information and the terminal information to a pre-trained user activity forecast model, and train the user activity forecast model by using a preset algorithm, so as to obtain an activity forecast result of the terminal user.

With reference to the third possible implementation manner of the third aspect, in a fourth possible implementation manner of the third aspect, the mobile terminal further includes:

a reporting unit, configured to report activity information of the terminal user to the server based on a preset time period, so that the server updates the user activity classification model and the user activity forecast model according to the activity information; and a receiving unit, configured to receive the updated user activity classification model and user activity forecast model that are returned by the server.

According to a fourth aspect, a server is provided, where the server includes:

a receiving unit, configured to receive terminal information collected by a mobile terminal, where the terminal information includes a position of the mobile terminal;

an obtaining unit, configured to obtain prior probability information of different types of user activities at current time and in the position; and a sending unit, configured to send the prior probability information of different types of user activities that is obtained by the obtaining unit to the mobile terminal, so that the mobile terminal recognizes or forecasts, according to the prior probability information and the terminal information, an activity of a terminal user using the mobile terminal.

With reference to the fourth aspect, in a first possible implementation manner of the fourth aspect, the terminal information includes: terminal sensing information and user operation information, where the terminal sensing information includes the position of the mobile terminal; and the obtaining unit is specifically configured to query a human activity distribution database according to the current time and the position of the mobile terminal, so as to obtain the prior probability information of different types of user activities.

With reference to the first possible implementation manner of the fourth aspect, in a second possible implementation manner of the fourth aspect, the server further includes:

an acquiring unit, configured to acquire human activity information from network information;

a statistics unit, configured to perform classification statistics on the human activity information acquired by the acquiring unit, so as to obtain probability information of different user activities at different time and in different positions; and a storing unit, configured to store the probability information obtained by the statistics unit as a prior probability of a user activity in the human activity distribution database.

With reference to the fourth aspect, the first possible implementation manner of the fourth aspect, or the second possible implementation manner of the fourth aspect, in a third possible implementation manner of the fourth aspect, the receiving unit is further configured to receive activity information of the terminal user, which is reported by the mobile terminal based on a preset time period; and the server further includes:

an updating unit, configured to update the user activity classification model and the user activity forecast model according to the activity information received by the receiving unit; and a delivering unit, configured to deliver the user activity classification model and the user activity forecast model that are updated by the updating unit to the mobile terminal.

According to a fifth aspect, a mobile terminal is provided, where the mobile terminal includes: a sensing apparatus, a network interface, and a processor, where:

the sensing apparatus is configured to collect terminal sensing information belonging to terminal information, where the terminal sensing information includes a position of the mobile terminal;

the processor is configured to collect user operation information belonging to the terminal information;

the network interface is configured to establish a communication connection with a server and obtain prior probability information of different types of user activities at current time and in the position from the server; and the processor is further configured to recognize or forecast, according to the prior probability information and the terminal information, an activity of a terminal user using the mobile terminal.

With reference to the fifth aspect, in a first possible implementation manner of the fifth aspect, the sensing apparatus is specifically configured to collect the terminal sensing information based on a set time period; or collect the terminal sensing information when receiving a collect command input by the terminal user, where the terminal sensing information includes the position of the mobile terminal; and the processor is specifically configured to collect the user operation information based on the preset time period; or collect the user operation information when receiving the collect command input by the terminal user.

With reference to the fifth aspect or the first possible implementation manner of the fifth aspect, in a second possible implementation manner of the fifth aspect, the network interface is specifically configured to send the position of the mobile terminal to the server, so that the server queries a human activity distribution database according to the current time and the position, so as to obtain the prior probability information of different types of user activities; and receive the prior probability information of different types of user activities that is returned by the server.

With reference to the fifth aspect, the first possible implementation manner of the fifth aspect, or the second possible implementation manner of the fifth aspect, in a third possible implementation manner of the fifth aspect, the processor is specifically configured to input the prior probability information and the terminal information to a pre-trained user activity classification model, and train the user activity classification model by using a preset algorithm, so as to obtain an activity recognition result of the terminal user; or input the prior probability information and the terminal information to a pre-trained user activity forecast model, and train the user activity forecast model by using a preset algorithm, so as to obtain an activity forecast result of the terminal user.

With reference to the third possible implementation manner of the fifth aspect, in a fourth possible implementation manner of the fifth aspect, the processor is further configured to report activity information of the terminal user to the server based on a preset time period by using the network interface, so that the server updates the user activity classification model and the user activity forecast model according to the activity information; and receive the updated user activity classification model and user activity forecast model that are returned by the server by using the network interface.

According to a sixth aspect, a server is provided, where the server includes: a network interface and a processor, where:

the network interface is configured to receive terminal information collected by a mobile terminal, where the terminal information includes a position of the mobile terminal; and the processor is configured to obtain prior probability information of different types of user activities at current time and in the position, and send the prior probability information of different types of user activities to the mobile terminal by using the network interface, so that the mobile terminal recognizes or forecasts, according to the prior probability information and the terminal information, an activity of a terminal user using the mobile terminal.

With reference to the sixth aspect, in a first possible implementation manner of the sixth aspect, the terminal information includes: terminal sensing information and user operation information, where the terminal sensing information includes the position of the mobile terminal; and the processor is specifically configured to query a human activity distribution database according to the current time and the position of the mobile terminal, so as to obtain the prior probability information of different types of user activities.

With reference to the first possible implementation manner of the sixth aspect, in a second possible implementation manner of the sixth aspect, the processor is further configured to acquire human activity information from network information, perform classification statistics on the human activity information to obtain probability information of different user activities at different time and in different positions, and store the probability information as a prior probability of a user activity in the human activity distribution database.

With reference to the sixth aspect, the first possible implementation manner of the sixth aspect, or the second possible implementation manner of the sixth aspect, in a third possible implementation manner of the sixth aspect, the network interface is further configured to receive activity information of the terminal user, which is reported by the mobile terminal based on a preset time period; and the processor is further configured to update the user activity classification model and the user activity forecast model according to the activity information, and deliver the updated user activity classification model and user activity forecast model to the mobile terminal by using the network interface.

In the embodiments of the present invention, a mobile terminal collects terminal information that includes a position of the mobile terminal, obtains prior probability information of different types of user activities at current time and in the position from a server, and recognizes or forecasts, according to the prior probability information and the terminal information, an activity of a terminal user using the mobile terminal. In the embodiments of the present invention, during recognition or forecast of a user activity, an activity of a terminal user is recognized or forecasted with reference to not only terminal data of the terminal user but also prior probability information of different types of user activities. During the recognition or the forecast, the number of data samples increases, and therefore accuracy of the recognition or the forecast is improved; in addition, a difference between information that is pushed to the terminal user by applying a recognition or forecast result in this embodiment of the present invention and information in which the user is interested is comparatively small, and therefore terminal using experience of the user can be improved.

BRIEF DESCRIPTION OF DRAWINGS

To describe the technical solutions in the embodiments of the present invention more clearly, the following briefly introduces the accompanying drawings required for describing the embodiments. Apparently, a person of ordinary skill in the art may still derive other drawings from these accompanying drawings without creative efforts.

DESCRIPTION OF EMBODIMENTS

The following embodiments of the present invention provide a method for processing user information, a mobile terminal, and a server.

In order to enable a person skilled in the art to have a better understanding of technical solutions in the embodiments of the present invention and make the objectives, features, and advantages of the embodiments of the present invention more comprehensible, the technical solutions in the embodiments of the present invention are further described in detail in the following with reference to the accompanying drawings.

Figure 1A:
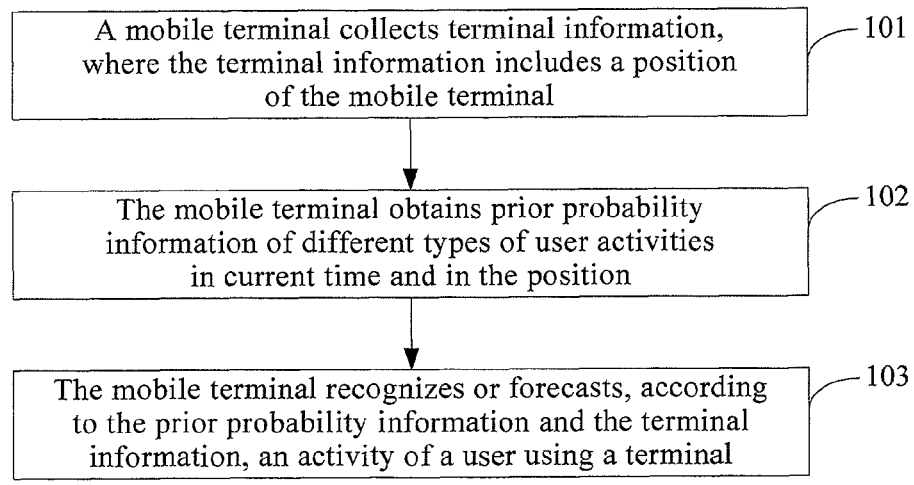
FIG. 1A is a flowchart of an embodiment of a method for processing user information according to the present invention.

Refer to FIG. 1A, which is a flowchart of an embodiment of a method for processing user information according to the present invention. The embodiment describes a process of processing user information on a mobile terminal side as follows:

Step 101: A mobile terminal collects terminal information, where the terminal information includes a position of the mobile terminal.

In this embodiment, the terminal information may include: terminal sensing information and user operation information. The terminal sensing information may be collected by various types of sensing apparatuses on the mobile terminal. For example, the sensing apparatus may include a speed sensor, an acceleration sensor, a global positioning system (Global Positioning System, GPS) apparatus, a wireless fidelity (Wireless Fidelity, WiFi) apparatus, and the like. The terminal sensing information may include, in addition to the position of the mobile terminal, also acceleration, angle, illumination, sound, and the like of the mobile terminal. The user operation information may include terminal start, terminal power recharging, terminal communication, terminal traffic using, terminal setting, terminal video-recording, terminal photographing, terminal recording, application download, application using, address access by a browser, and the like.

The position in this embodiment refers to various geographic area ranges divided in advance. A position of a terminal indicates a certain geographic area range in which the terminal resides. For example, the position may include a CBD area, a city center road area, a university town area, and the like. It should be noted that the foregoing is only an example of position division. In a practical application, the position division may be performed flexibly according to requirements, which is not limited in this embodiment of the present invention.

In this embodiment, the mobile terminal may collect the terminal sensing information and the user operation information based on a set time period; or the mobile terminal may also collect the terminal sensing information and the user operation information when receiving a collect command input by a terminal user.

Step 102: The mobile terminal obtains prior probability information of different types of user activities at current time and in the position.

In this embodiment, the mobile terminal may send collected position of the mobile terminal to a server, and the server queries a human activity distribution database according to the current time and the position to obtain the prior probability information of different types of user activities at the time and in the position; and receive the prior probability information of different types of user activities that is returned by the server. The prior probability (prior probability) refers to a probability obtained by performing analysis according to past experience and historical data. In this embodiment of the present invention, the human activity distribution database stores probabilities, which are calculated according to historical data of user activities, of different types of user activities in different time and in different positions, that is, prior probability information of different types of user probability information at different time and in different positions.

Step 103: The mobile terminal recognizes or forecasts, according to the prior probability information and the terminal information, an activity of a terminal user using the mobile terminal.

In this embodiment, in a daily use process, the mobile terminal may report activity information of the terminal user to the server based on a preset time period, so that the server updates a user activity classification model or a user activity forecast model according to the activity information; and receive the updated user activity classification model and user activity forecast model that are returned by the server.

When the mobile terminal needs to recognize the activity of the terminal user, the mobile terminal may input the acquired prior probability information and the collected terminal information to a pre-trained user activity classification model, and train the user activity classification model by using a preset algorithm, so as to obtain an activity recognition result of the terminal user; and when the mobile terminal needs to forecast the activity of the terminal user, the mobile terminal may input the acquired prior probability information and the collected terminal information to a pre-trained user activity forecast model, and train the user activity forecast model by using a preset algorithm, so as to obtain an activity forecast result of the terminal user.

In this embodiment of the present invention, when the user activity classification model and the user activity forecast model is trained, a linear regression algorithm, a decision tree algorithm, a conditional random field algorithm, or the like may be used. When these algorithms are used to recognize or forecast the user activity, a main difference from the prior art is that prior probability information of a human activity added, and therefore accuracy of the recognition or the forecast can be improved.

It can be seen from the foregoing embodiment that, in this embodiment, during recognition or forecast of a user activity, an activity of a terminal user is recognized or forecasted with reference to not only data of a terminal user but also prior probability information of different types of user activities. During the recognition or the forecast, the number of data samples increases, and therefore accuracy of the recognition or the forecast is improved; in addition, a difference between information that is pushed to the terminal user by applying a recognition or forecast result in this embodiment of the present invention and information in which the user is interested is comparatively small, and therefore terminal using experience of the user can be improved.

Figure 1B:
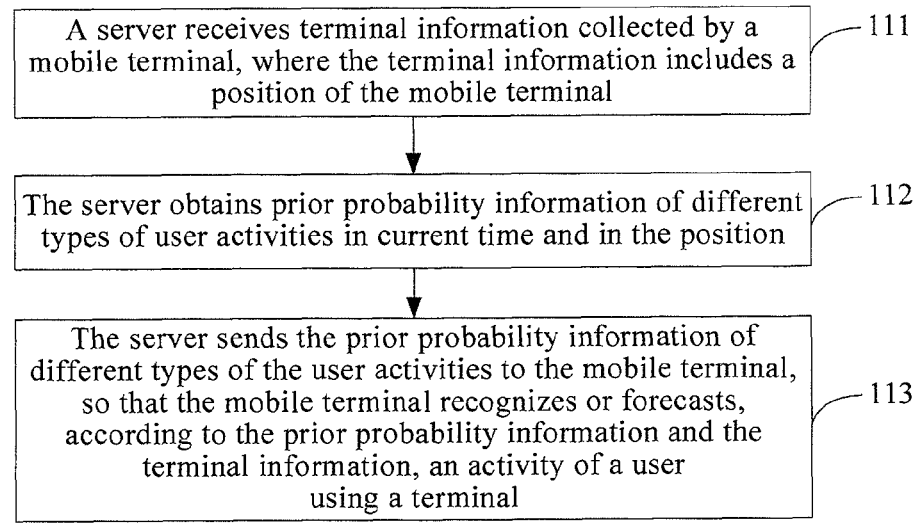
FIG. 1B is a flowchart of another embodiment of a method for processing user information according to the present invention.

Refer to FIG. 1B, which is a flowchart of an embodiment of a method for processing user information according to the present invention. The embodiment describes a process of processing user information on a server side as follows:

Step 111: A server receives terminal information collected by a mobile terminal, where the terminal information includes a position of the mobile terminal.

In this embodiment, the terminal information may include: terminal sensing information and user operation information. The terminal sensing information may be collected by various types of sensing apparatuses on the mobile terminal. For example, the sensing apparatus may include a GPS apparatus, a WiFi apparatus, and the like. The terminal sensing information, besides including the position of the mobile terminal, may also include acceleration, angle, illumination, sound, and the like of the mobile terminal. The user operation information may include terminal start, terminal power recharging, terminal communication, terminal traffic using, terminal setting, terminal video-recording, terminal photographing, terminal recording, application download, application using, address accessing by a browser, and the like.

The position in this embodiment refers to various geographic area ranges divided in advance. A position of a terminal indicates a certain geographic area range in which the terminal resides. For example, the position may include a CBD area, a city center road area, a university town area, and the like. It should be noted that the foregoing is only an example of position dividing. In a practical application, the position dividing can be performed flexibly according to requirements, which is not limited in this embodiment of the present invention.

In this embodiment, the server may receive the terminal sensing information and the user operation information which is collected, based on a set time period, by the mobile terminal; or the server may also receive the terminal sensing information and user operation information which are collected, when receiving a collect command input by a terminal user, by the mobile terminal.

Step 112: The server obtains prior probability information of different types of user activities at current time and in the position.

In this embodiment, the server may acquire human activity information from mass network information is advance, perform classification statistics on the human activity information to obtain probability information of different user activities at different time and in different positions, use the obtained probability information as a prior probability of user activities, and store the probability information in a human activity distribution database in dimensions of time and position. When receiving the position sent by the mobile terminal, the server may query the human activity distribution database according to the current time and the position to obtain prior probability information of different types of user activities.

Step 113: The server sends the prior probability information of different types of user activities to the mobile terminal, so that the mobile terminal recognizes or forecasts, according to the prior probability information and the terminal information, an activity of a terminal user using the mobile terminal.

In this embodiment, in a daily use process, the mobile terminal may report activity information of the terminal user to the server based on a preset time period; and after receiving the activity information of the terminal user, the server updates a user activity classification model and a user activity forecast model of the mobile terminal according to the activity information, and delivers the updated user activity classification model and user activity forecast model to the mobile terminal, so that the terminal may recognize a user activity of the terminal user according to the user activity classification model or forecast a user activity of the terminal user according to the user activity forecast model.

It can be seen from the foregoing embodiment that, in this embodiment, during recognition or forecast of a user activity, an activity of a terminal user is recognized or forecasted with reference to not only data of a terminal user but also prior probability information of different types of user activities. During the recognition or the forecast, the number of data samples increases, and therefore accuracy of the recognition or the forecast is improved; in addition, a difference between information that is pushed to the terminal user by applying a recognition or forecast result in this embodiment of the present invention and information in which the user is interested is comparatively small, and therefore terminal using experience of the user can be improved.

Figure 2:
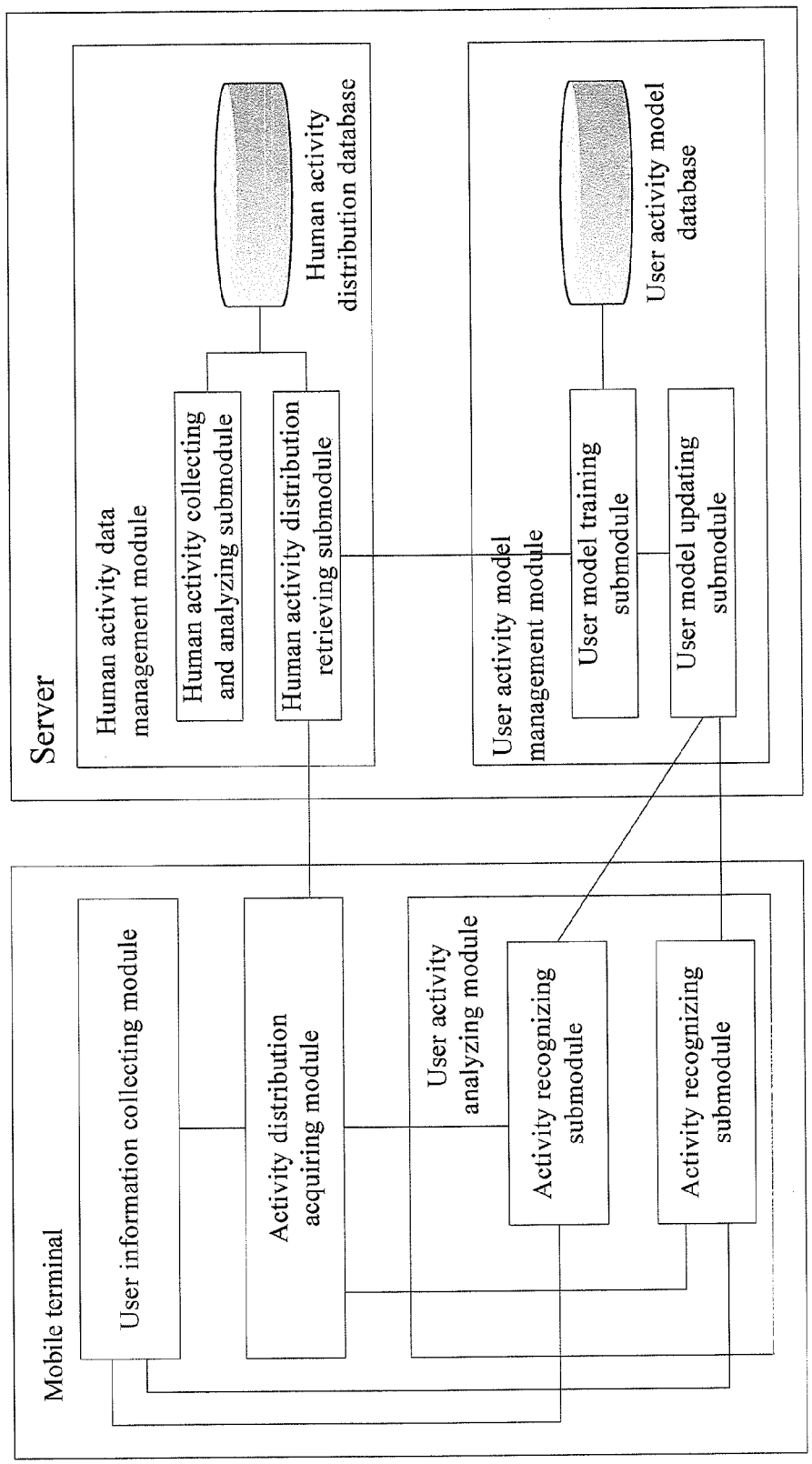
FIG. 2 is a schematic architecture diagram of a system for recognizing and forecasting a user activity where an embodiment of the present invention is applied.

Refer to FIG. 2 which is a schematic diagram of an interactive architecture of a terminal and a server according to application of an embodiment of the present invention.

In FIG. 2, the server includes a human activity data management module and a user activity model management module, where the human activity data management module further includes a human activity collecting and analyzing submodule, a human activity distribution retrieving submodule, and a human activity distribution database; and the user activity model management module further includes a user activity model training submodule, a user activity model updating submodule, and a user activity model database.

The terminal includes a user information collecting module, an activity distribution acquiring module, and a user activity analyzing module, where the user activity analyzing module may further include an activity recognizing submodule and an activity forecasting submodule.

For the human activity data management module inside the server:

The human activity collecting and analyzing submodule may acquire human activity information from mass network information by using a set human activity information service interface, where the network information may include social sharing, online signing, online comment, life diaries, and the like, and the human activity information may include activity time, activity positions, activity content (such as text, picture, and name of a signing location), user features (such as residential address, gender, age, and occupation), and the like; perform classification statistics on the human activity information to obtain probability information of various activities of different user types at different activity time and in different activity positions; and store the probability information of the various activities in the human activity distribution database based on time, a position, and a user type. The human activity distribution retrieving submodule may provide a retrieve interface to the activity distribution acquiring module inside the terminal, so that the activity distribution acquiring module can retrieve probability information of various activities corresponding to specific time, a specific position, and a specific user type from the human activity distribution database by using the human activity distribution retrieving submodule, use the retrieved probability information as a prior probability for recognizing or forecasting a user activity of a certain user, so as to recognize or forecast the activity of the user more accurately.

For the user activity model management module inside the server:

The user activity model database is configured to acquire, by means of interaction of the server and the terminal and from the user information collecting module of each terminal, activity information of a terminal user using the terminal at each time and record the activity information, where the activity information may include activity date, time, position, acceleration, label information, and like information.

The user activity model training submodule is configured to obtain an activity information record of the terminal user from the user activity model database and train a personal user activity classification model and a user activity forecast model according to the activity information. For a user activity information record that has label information, user behavior modes may be clustered according to the user activity information, similarity of the user behavior modes is calculated, and in constraint of a similarity matrix, a behavior mode of each user is trained according to the label information, so as to obtain a personal user activity classification model and user activity forecast model, where a training method may use a classification algorithm, such as a linear regression algorithm, a decision tree algorithm, and a condition random fields algorithm, a random walk may be performed according to the similarity matrix, and iteration adjustment is performed on a middle result of the training. For a user activity information record that does not have label information, prior probability information of various activities may be retrieved from the human activity distribution database according to time, locations, and user types by using the human activity distribution retrieving submodule, and the prior probability information is used as features to train a behavior mode of each user, so as to obtain a personal user activity classification model and user activity forecast model.

The user activity model updating submodule is configured to update, to each terminal, the personal activity classification model and the personal activity forecast model of each terminal user that are obtained by the user activity training submodule.

For modules inside the terminal:

The user information collecting module is configured to collect terminal sensing information obtained by a sensing apparatus disposed on the mobile terminal, where the terminal sensing information may include a position, an acceleration, an angel, illumination, and a sound of the terminal, and may further collect user operation information of operations performed by the user on the terminal, where the user operation information may include terminal start, terminal power recharging, terminal communication, terminal traffic using, terminal setting, terminal video-taping, terminal photographing, terminal recording, application download, application using, address access by a browser, and the like.

The activity distribution acquiring module is configured to obtain, from the user information collecting module, a position of the mobile terminal collected by the sensing apparatus and retrieve, by using current time and the position indexes, probability information of various activities performed by the user at the time and in the position from the human activity distribution database by using the retrieve interface provided by the human activity distribution retrieving submodule inside the server, such as probabilities of work, dinner, shopping, driving, an outdoor activity performed by the user at the time and in the position. Further, in addition to statistics performed by using the time and the position, if a dimension for distinguishing by using a user type can also be added for the probability information of various user activities in the human activity distribution database, correspondingly the activity distribution acquiring module may further acquire a user type of the terminal user on the basis of obtaining the current time and the position, and then obtains probability information of various activities performed by users of the user type at the time and the position from the human activity distribution database according to the current time, the position, and the user type, thereby improving accuracy of recognition or forecast of a terminal user activity.

For the user activity analyzing module, the activity recognizing submodule is configured to train the user activity classification model by using the linear regression, decision tree, condition random fields, and like classification algorithms according to the probability information acquired by the activity distribution acquiring module and the information collected by the user information collecting module, so as to obtain a user activity recognition result of the mobile terminal, where the probability information and the information are used as input features of the user activity classification model; and the activity forecasting submodule is configured to train the user activity forecast model by using the linear regression, decision tree, condition random fields, and like classification algorithms according to the probability information acquired by the activity distribution acquiring module and the information collected by the user information collecting module, so as to obtain a user activity forecast result of the mobile terminal, where the probability information and the information are used as input features of the user activity forecast model.

The structure shown in FIG. 2 is applied. Recognition of a user activity is used as an example. It is assumed that a mobile terminal obtains a terminal user position "CBD area" and time "7:00 p.m. weekend", and it is obtained, by interacting with a server, that a probability of a user to do shopping and have dinner in the CBD area at 7:00 p.m. of a weekend is the highest, and terminal acceleration information collected by the mobile terminal reflects that the terminal user is currently in a stop-and-go motion. The probability information and the acceleration information are input to a user activity classification model, and it can be recognized, by training the model, that the user is walking on a street. Forecast of a user activity is used as an example. It is assumed that a mobile terminal obtains a terminal user position "city center street" and time "8:00 a.m. work day", and it is recognized that the ongoing user activity of the terminal user is driving. The mobile terminal forecasts, by using a forecast model trained by the historical data of the terminal user, that the next activity of the terminal user is going to office, and meanwhile the mobile terminal obtains, by interacting with a server, that the next activity of the highest prior probability for terminal users driving on the city center street at 8:00 a.m. on a work day is going to office, the prior probability of going to office and the next activity of going to office forecasted by the forecast model trained by the historical data of the terminal user are input to the user activity forecast model, and it is forecasted, by training the model, that the next activity of the user is going to office.

Figure 3:
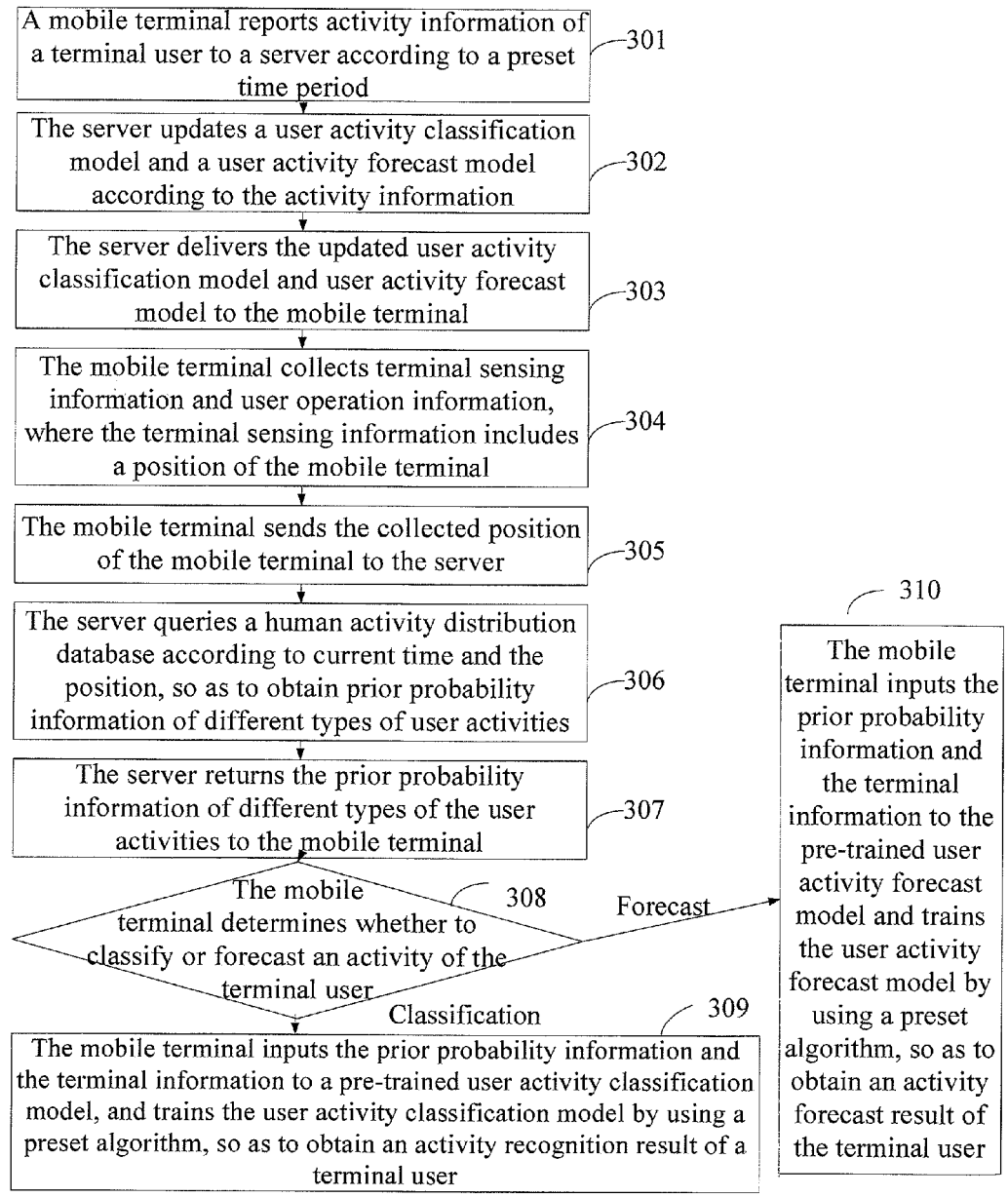
FIG. 3 is a flowchart of another embodiment of a method for processing user information according to the present invention.

Refer to FIG. 3, which is a flowchart of another embodiment of a method for processing user information according to the present invention. This embodiment describes in detail a process of recognizing or forecasting a user activity with reference to an actual application as follows:

Step 301: A mobile terminal reports activity information of a terminal user to a server based on a preset time period.

In this embodiment, to implement recognition or forecast of a user activity of a terminal user, the server may train a user activity model of a terminal user of each mobile terminal, including a user activity classification model and a user activity forecast model. During training of the user activity model, historical activity data of the terminal user needs to be obtained. Therefore, the mobile terminal may report the activity information of the terminal user as historical activity data of the user to the server based on the preset time period.

Step 302: The server updates the user activity classification model and the user activity forecast model according to the activity information.

During update of a personal user activity classification model of the terminal user, for the activity information of the terminal user reported by the same mobile terminal, the server may use time, position, and a combination of time and position in the activity information as a feature respectively, and calculate a value of a factor of the feature by using a gradient descent method, so as to obtain the personal user activity classification model of the terminal user, for example:

$$P1(a|l,t)=\sigma(a*l+b*t+c*lt+D*acc+E*app\text{-}usage+F*wifi+G*Chg)$$

In the user activity classification model, l represents a position, and a is a factor of l; t represents time, and b is a factor of t; lt represents a combination of the position and the time, and c is a factor of lt; acc is a feature generated in 3D acceleration data obtained by a sensing apparatus of the mobile terminal, such as acceleration strength and power in a single time segment, a peak value, a mean value, a variance of the acceleration on three dimensional directions, and D is a factor of acc; app-usage represents a feature of a plurality of applications used by the mobile terminal, and E is a factor of app-usage; wifi represents a read WiFi MAC address list, and F is a factor of wifi; and Chg is a power recharging state of the mobile terminal, and G is a factor of Chg.

During update of a personal user activity forecast model of the terminal user, the following PY model may be used:

$$P(v_i=A|t_i=t,v_i-1=lk)=P(v_i=A|v_i-1=lk)*N(h|\mu,\sigma*\sigma)$$

In the personal user activity forecast model of the terminal user, $P(v_i=A|t_i=t, v_i-1=lk)$ represents an activity probability of the terminal user in I moment; $v_i-1=lk$ is a position of the terminal user in I-1 moment, N is a normal distribution formula, h represents a time interval in unit of hour, and $(\mu,\sigma*\sigma)$ represents a normal distribution parameter. The PY model is trained by using a gradient descent method and by using the activity information of the terminal user reported by the mobile terminal, so as to obtain the personal user activity forecast model of the terminal user.

It should be noted that the PY model is only a simple example of an online learning algorithm. An adboost ensemble learning algorithm or other online learning algorithms may also be used to update the user activity forecast model, which is not limited in this embodiment of the present invention.

Step 303: The server delivers the updated user activity classification model and user activity forecast model to the mobile terminal.

It should be noted that the mobile terminal continuously reports the activity information of the terminal user, and an activity habit of the terminal user may change as time goes by. Therefore, the server may also update the personal user activity classification model and user activity forecast model of the terminal user according to a certain time period, and deliver the updated user activity classification model and user activity forecast model to the mobile terminal.

Step 304: The mobile terminal collects terminal sensing information and user operation information, where the terminal sensing information includes a position of the mobile terminal.

In this embodiment, when an activity of the terminal user needs to be recognized or forecasted, the mobile terminal collects the current terminal sensing information and user operation information. Various sensing apparatuses, such as a speed sensor, an acceleration sensor, a GPS apparatus, a WiFi apparatus, and the like, may be arranged on the mobile terminal. These sensing apparatuses can be used to collect various types of terminal sensing information, such as a terminal position, acceleration, angel, illumination, sound, and the like. In addition, various types of user operation information is generated in a process in which the terminal user performs operations on the mobile terminal, such as terminal start, power recharging, communication, traffic using, terminal setting information, photographing, sound recording, application download, application using, browser accessing, and the like.

It should be noted that the foregoing provides only a specific example of the terminal sensing information and the user operation information. During recognition or forecast of the user activity, the user activity can be recognized or forecasted according to an input feature required by an actual user activity model and by using partial information or all information of the foregoing information, which is not limited in this embodiment of the present invention.

Step 305: The mobile terminal sends the collected position of the mobile terminal to the server.

Step 306: The server queries a human activity distribution database according to current time and the position, so as to obtain prior probability information of different types of user activities.

In this embodiment, the server may acquire human activity information from mass network information by using a set human activity information service interface, where the network information may include social sharing, online signing, online comment, a life diary, and the like, and the human activity information may include activity time, an activity position, activity content (such as text, a picture, and a name of a signing location), user feature (such as a residential address, gender, age, and an occupation), and the like; then, perform classification statistics on the human activity information to obtain probability information of various activities of different user types at different time and in different positions; and store the probability information of the various activities in the human activity distribution database according to time and a position, and further according to user types.

By using an example in which probability information of a human activity is stored according to time and a position, an example of a probability information record in the human activity distribution database is as follows:

From 11:30 to 13:00 on a work day, probabilities of various human activities listed in a descending order are as follows: lunch, work, and window-shopping; from 19:00 to 23:00 on a work day, probabilities of various human activities listed in a descending order are as follows: shopping, dinner, and work; and from 9:00 to 10:00 on a rest day, probabilities of different human activities listed in a descending order are as follows: window-shopping, going to a park, and staying at home. It should be noted that the foregoing probability information is used as an example. In a practical application, statistics may be performed on more types of user activities and probability information, so as to recognize or forecast a user activity more accurately.

When receiving the position information collected by the mobile terminal, the server may use the current time and the position information as indexes for querying the human activity distribution database, so as to obtain the prior probability information of different types of user activities, and use the prior probability information as reference information for recognizing or forecasting a user activity, thereby improving accuracy of recognizing or forecasting the user activity.

Step 307: The server returns the prior probability information of different types of user activities to the mobile terminal.

Step 308: The mobile terminal determines to classify or forecast an activity of the terminal user, for classification, performs step 309; and for forecast, performs step 310.

Step 309: The mobile terminal inputs the prior probability information and the terminal information to a pre-trained user activity classification model, trains the user activity classification model by using a preset algorithm to obtain an activity recognition result of the terminal user, and ends the current procedure.

With reference to the personal user activity classification model, which is updated in step 302, of the terminal user, the mobile terminal may input the currently collected terminal information to the personal user activity classification model of the terminal user to obtain probabilities of various activities performed by the terminal user, and train the following global user activity classification model to obtain a final activity recognition result of the terminal user:

$$P(a|l,t)=\sigma(m*P1(a|l,t)+n*P(\text{pre}|l,t)+g*cnt)$$

The foregoing user activity classification model is a global log linear regression model, where $P1(a|l,t)$ is probabilities of various activities calculated according to a personal activity classification model, $P(\text{pre}|l,t)$ is prior probabilities of various activities, and cnt is the number of personal samples of the terminal user.

Step 310: The mobile terminal inputs the prior probability information and the terminal information to a pre-trained user activity forecast model, trains the user activity forecast model by using a preset algorithm to obtain an activity forecast result of the terminal user, and ends the current procedure.

With reference to the personal user activity forecast model, which is updated in step 302, of the terminal user, the mobile terminal may input the currently collected terminal information to a personal user activity forecast model of the terminal user to obtain probabilities of different future activities to be performed by the terminal user, and train the following global user activity forecast model to obtain a final recognition result of a next activity of the terminal user:

$$P(A|l,t,v_i-1=lk)=\sigma(m*P1(A|l,t,v_i-1|lk)+n*P(\text{pre}|l,t, A_i-1)+g*cnt)$$

The user activity forecast model is a global log linear regression model, where $P1(A|l,t,vi-1=lk)$ is probabilities of various future activities to be performed by the terminal user calculated according to the personal activity forecast model, $P(\text{pre}|l,t,A_i-1)$ is prior probabilities of various activities to be performed next, and cnt is the number of personal samples of the terminal user.

It should be noted that the log linear regression model is only a simple example of an online learning algorithm. An adboost ensemble learning algorithm or other online learning algorithms may also be used to train the user activity forecast model, so as to obtain an activity recognition result, which is not limited in this embodiment of the present invention.

It should be noted that, in the user activity classification model in step 309 and the user activity forecast model in step 310, a user feature and a user similarity feature may further be extended, which is not limited in this embodiment of the present invention.

It can be seen from the foregoing embodiment that, in this embodiment, during recognition or forecast of a user activity, an activity of a terminal user is recognized or forecasted with reference to not only data of a terminal user but also prior probability information of different types of user activities. During the recognition or the forecast, the number of data samples increases, and therefore accuracy of the recognition or the forecast is improved; in addition, a difference between information that is pushed to the terminal user by applying a recognition or forecast result in this embodiment of the present invention and information in which the user is interested is comparatively small, and therefore terminal using experience of the user can be improved.

Corresponding to the embodiments of the method for processing user information according to the present invention, the present invention further provides embodiments of a mobile terminal and a server.

Figure 4:
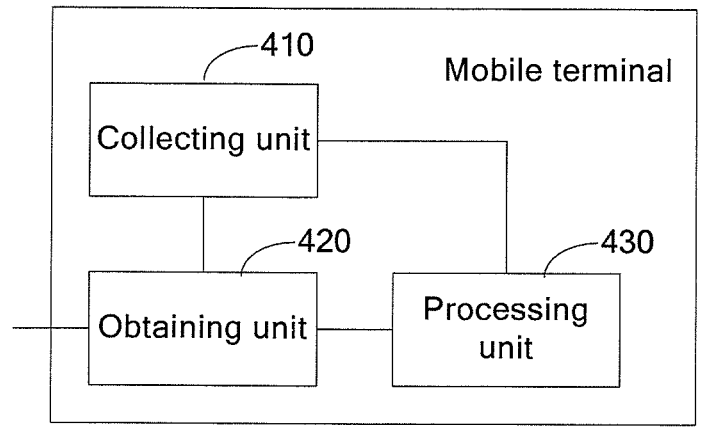
FIG. 4 is a block diagram of an embodiment of a mobile terminal according to the present invention.

Refer to FIG. 4, which is a block diagram of an embodiment of a mobile terminal according to the present invention.

The mobile terminal includes a collecting unit 410, an obtaining unit 420, and a processing unit 430.

The collecting unit 410 is configured to collect terminal information, where the terminal information includes a position of the mobile terminal.

The obtaining unit 420 is configured to obtain prior probability information of different types of user activities at current time and in the position.

The processing unit 430 is configured to recognize or forecast, according to the prior probability information obtained by the obtaining unit 420 and the terminal information collected by the collecting unit 410, an activity of a terminal user using the mobile terminal.

In an optional implementation manner, the terminal information collected by the collecting unit 410 may include terminal sensing information and user operation information, where the terminal sensing information includes the position of the mobile terminal.

The collecting unit 410 may be specifically configured to collect the terminal sensing information and the user operation information based on a set time period; or collect the terminal sensing information and the user operation information when receiving a collect command input by the terminal user.

In another optional implementation manner, the obtaining unit 420 may include (not shown in FIG. 4):

an information sending subunit, configured to send the position of the mobile terminal collected by the collecting unit 410 to a server, so that the server queries a human activity distribution database according to the current time and the position, so as to obtain prior probability information of different types of user activities; and a probability receiving subunit, configured to receive the prior probability information of different types of user activities that is returned by the server.

In another optional implementation manner, the processing unit 430 may include at least one of the following subunits (not shown in FIG. 4):

an activity recognizing subunit, configured to input the prior probability information and the terminal information to a pre-trained user activity classification model, and train the user activity classification model by using a preset algorithm, so as to obtain an activity recognition result of the terminal user; and an activity forecast subunit, configured to input the prior probability information and the terminal information to a pre-trained user activity forecast model, and train the user activity forecast model by using a preset algorithm, so as to obtain an activity forecast result of the terminal user.

Figure 5:
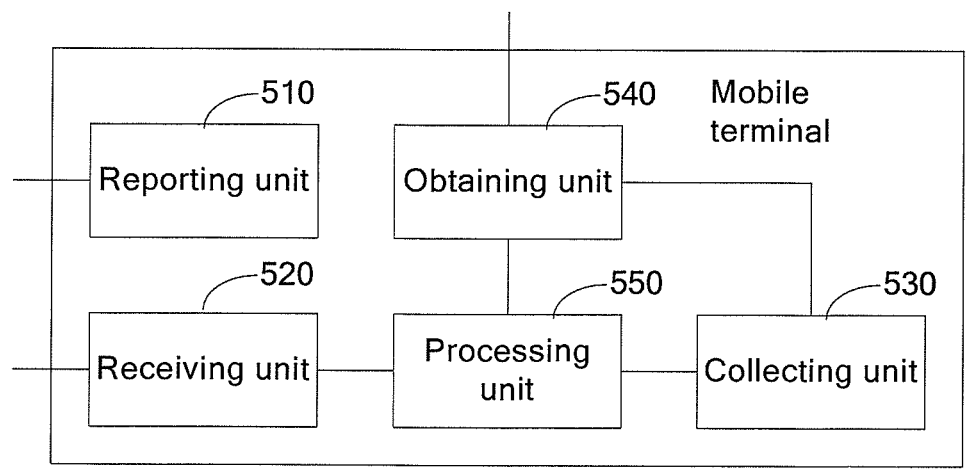
FIG. 5 is a block diagram of another embodiment of a mobile terminal according to the present invention.

Refer to FIG. 5, which is a block diagram of another embodiment of a mobile terminal according to the present invention.

The mobile terminal includes a reporting unit 510, a receiving unit 520, a collecting unit 530, an obtaining unit 540, and a processing unit 550.

The reporting unit 510 is configured to report activity information of a terminal user to a server based on a preset time period, so that the server updates a user activity classification model or a user activity forecast model according to the activity information.

The receiving unit 520 is configured to receive the updated user activity classification model and user activity forecast model that are returned by the server.

The collecting unit 530 is configured to collect terminal information, where the terminal information includes a position of the mobile terminal.

The obtaining unit 540 is configured to obtain prior probability information of different types of user activities at current time and in the position.

The processing unit 550 is configured to recognize or forecast, according to the prior probability information obtained by the obtaining unit 540 and the terminal information collected by the collecting unit 530, an activity of a terminal user using the mobile terminal.

In an optional implementation manner, the terminal information collected by the collecting unit 530 may include terminal sensing information and user operation information, where the terminal sensing information includes the position of the mobile terminal.

The collecting unit 530 may be specifically configured to collect the terminal sensing information and the user operation information based on a set time period; or collect the terminal sensing information and the user operation information when receiving a collect command input by the terminal user.

In another optional implementation manner, the obtaining unit 540 may include (not shown in FIG. 5):

an information sending subunit, configured to send the position of the mobile terminal collected by the collecting unit 530 to the server, so that the server queries a human activity distribution database according to the current time and the position, so as to obtain prior probability information of different types of user activities; and a probability receiving subunit, configured to receive the prior probability information of different types of user activities that is returned by the server.

In another optional implementation manner, the processing unit 550 may include at least one of the following subunits (not shown in FIG. 5):

an activity recognizing subunit, configured to input the prior probability information and the terminal information to a pre-trained user activity classification model, and train the user activity classification model by using a preset algorithm, so as to obtain an activity recognition result of the terminal user; and an activity forecast subunit, configured to input the prior probability information and the terminal information to a pre-trained user activity forecast model, and train the user activity forecast model by using a preset algorithm, so as to obtain an activity forecast result of the terminal user.

Figure 6:
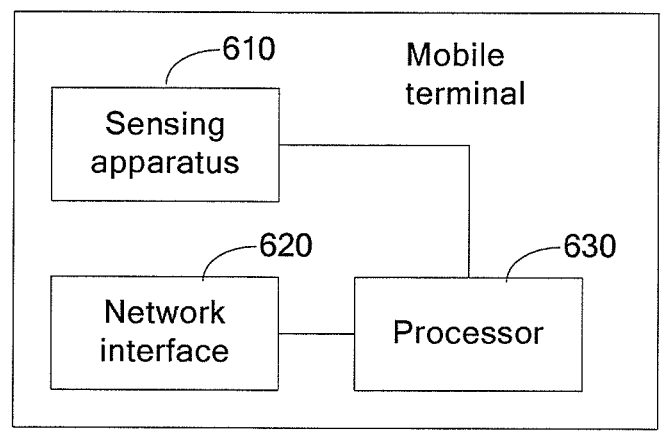
FIG. 6 is a block diagram of another embodiment of a mobile terminal according to the present invention.

Refer to FIG. 6, which is a block diagram of another embodiment of a mobile terminal according to the present invention.

The mobile terminal includes a sensing apparatus 610, a network interface 620, and a processor 630.

The sensing apparatus 610 is configured to collect terminal sensing information belonging to terminal information, where the terminal sensing information includes a position of the mobile terminal.

The processor 630 is configured to collect user operation information belonging to the terminal information.

The network interface 620 is configured to establish a communication connection with a server and obtain prior probability information of different types of user activities at current time and in the position from the server.

The processor 630 is further configured to recognize or forecast, according to the prior probability information and the terminal information, an activity of a terminal user using the mobile terminal.

In an optional implementation manner:

the sensing apparatus 610 may be specifically configured to collect the terminal sensing information based on a set time period; or collect the terminal sensing information when receiving a collect command input by the terminal user, where the terminal sensing information includes the position of the mobile terminal; and the processor 630 may be specifically configured to collect the user operation information based on the preset time period; or collect the user operation information when receiving the collect command input by the terminal user.

In another optional implementation manner:

the network interface 620 may be specifically configured to send the position of the mobile terminal to the server, so that the server queries a human activity distribution database according to the current time and the position, so as to obtain the prior probability information of different types of user activities; and receive the prior probability information of different types of user activities that is returned by the server.

In another optional implementation manner:

the processor 630 may be specifically configured to input the prior probability information and the terminal information to a pre-trained user activity classification model, and train the user activity classification model by using a preset algorithm, so as to obtain an activity recognition result of the terminal user; or input the prior probability information and the terminal information to a pre-trained user activity forecast model, and train the user activity forecast model by using a preset algorithm, so as to obtain an activity forecast result of the terminal user.

In another optional implementation manner:

the processor 630 may further be configured to report activity information of the terminal user to the server based on a preset time period by using the network interface 620, so that the server updates the user activity classification model and the user activity forecast model according to the activity information; and receive the updated user activity classification model and user activity forecast model that are returned by the server by using the network interface 620.

Figure 7:
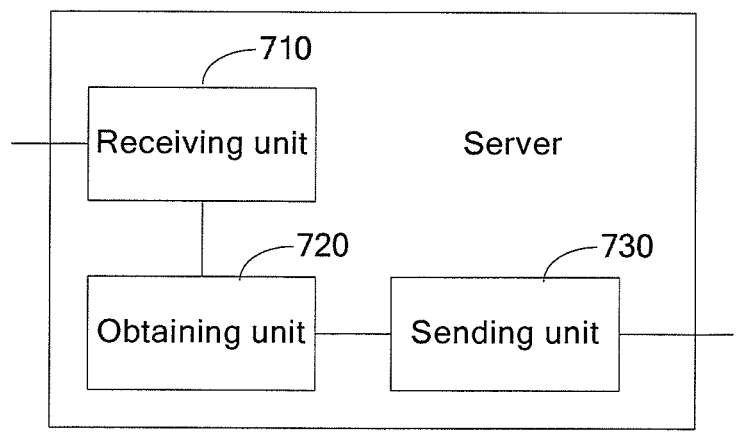
FIG. 7 is a block diagram of an embodiment of a server according to the present invention.

Refer to FIG. 7, which is a block diagram of an embodiment of a server according to the present invention;

The server includes a receiving unit 710, an obtaining unit 720, and a sending unit 730.

The receiving unit 710 is configured to receive terminal information collected by a mobile terminal, where the terminal information includes a position of the mobile terminal.

The obtaining unit 720 is configured to obtain prior probability information of different types of user activities at current time and in the position.

The sending unit 730 is configured to send the prior probability information of different types of user activities that is obtained by the obtaining unit 720 to the mobile terminal, so that the mobile terminal recognizes or forecasts, according to the prior probability information and the terminal information, an activity of a terminal user using the mobile terminal.

Optionally, the terminal information may include terminal sensing information and user operation information, where the terminal sensing information includes a position of the mobile terminal.

The obtaining unit 720 may be specifically configured to query a human activity distribution database according to the current time and the position of the mobile terminal, so as to obtain the prior probability information of different types of user activities.

Figure 8:
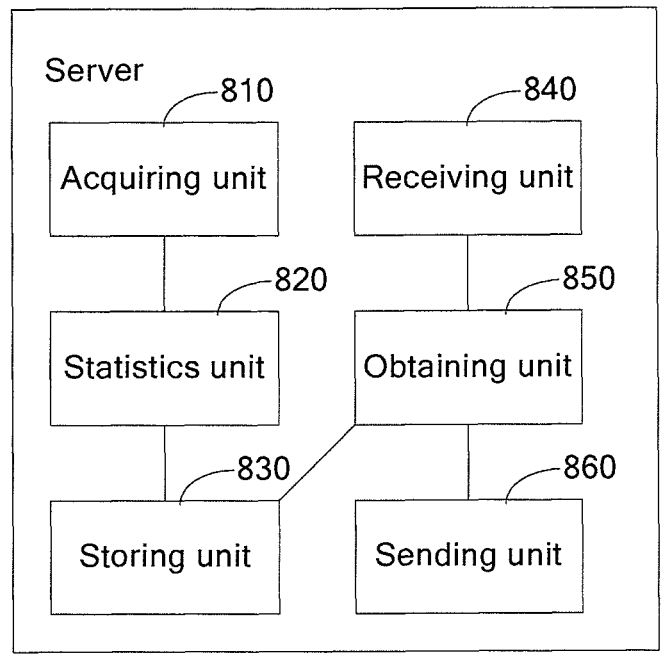
FIG. 8 is a block diagram of another embodiment of a server according to the present invention.

Refer to FIG. 8, which is a block diagram of another embodiment of a server according to the present invention.

The server includes an acquiring unit 810, a statistics unit 820, a storing unit 830, a receiving unit 840, an obtaining unit 850, and a sending unit 860.

The acquiring unit 810 is configured to acquire human activity information from network information.

The statistics unit 820 is configured to perform classification statistics on the human activity information acquired by the acquiring unit 810, so as to obtain probability information of different user activities at different time and in different positions.

The storing unit 830 is configured to store the probability information obtained by the statistics unit 820 as a prior probability of a user activity in the human activity distribution database.

The receiving unit 840 is configured to receive terminal information collected by a mobile terminal, where the terminal information includes a position of the mobile terminal.

The obtaining unit 850 is configured to obtain prior probability information of different types of user activities at current time and in the position from the human activity distribution database.

The sending unit 860 is configured to send the prior probability information of different types of user activities that is obtained by the obtaining unit 850 to the mobile terminal, so that the mobile terminal recognizes or forecasts, according to the prior probability information and the terminal information, an activity of a terminal user using the mobile terminal.

Optionally, the terminal information may include: terminal sensing information and user operation information.

The obtaining unit 850 may be specifically configured to query a human activity distribution database according to the current time and the position in the terminal sensing information, so as to obtain the prior probability information of different types of user activities.

Figure 9:
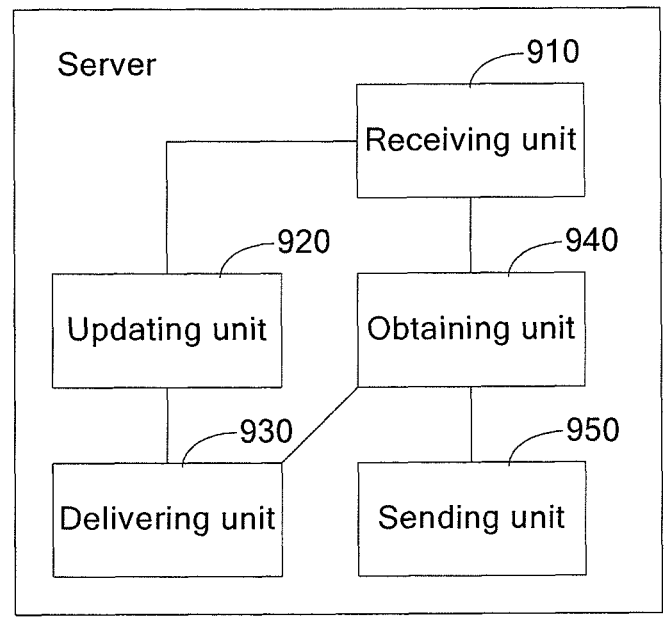
FIG. 9 is a block diagram of another embodiment of a server according to the present invention.

Refer to FIG. 9, which is a block diagram of another embodiment of a server according to the present invention.

The server includes a receiving unit 910, an updating unit 920, a delivering unit 930, an obtaining unit 940, and a sending unit 950.

The receiving unit 910 is configured to receive activity information of a terminal user, which is reported by the mobile terminal based on a preset time period.

The updating unit 920 is configured to update a user activity classification model and a user activity forecast model according to the activity information received by the receiving unit 910.

The delivering unit 930 is configured to deliver the user activity classification model and the user activity forecast model that are updated by the updating unit 920 to the mobile terminal.

The receiving unit 910 is configured to receive terminal information collected by the mobile terminal, where the terminal information includes a position of the mobile terminal.

The obtaining unit 940 is configured to obtain prior probability information of different types of user activities at current time and in the position.

The sending unit 950 is configured to send prior probability information of different types of user activities that is obtained by the obtaining unit 940, so that the mobile terminal recognizes or forecasts, according to the prior probability information and the terminal information, an activity of a terminal user using the mobile terminal.

Optionally, the terminal information may include: terminal sensing information and user operation information.

The obtaining unit 940 may be specifically configured to query a human activity distribution database according to the current time and the position in the terminal sensing information, so as to obtain the prior probability information of different types of user activities.

Figure 10:
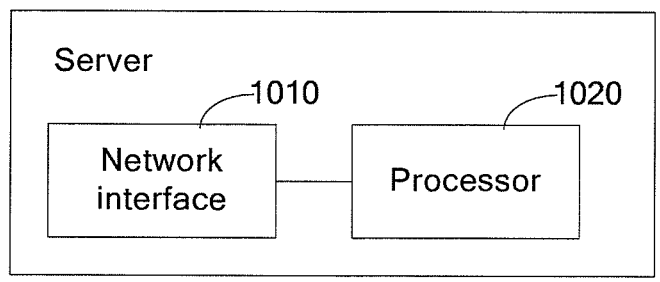
FIG. 10 is a block diagram of another embodiment of a server according to the present invention.

Refer to FIG. 10, which is a block diagram of another embodiment of a server according to the present invention.

The server includes a network interface 1010 and a processor 1020.

The network interface 1010 is configured to receive terminal information collected by a mobile terminal, where the terminal information includes a position of the mobile terminal.

The processor 1020 is configured to obtain prior probability information of different types of user activities at current time and in the position, and send the prior probability information of different types of user activities to the mobile terminal by using the network interface, so that the mobile terminal recognizes or forecasts, according to the prior probability information and the terminal information, an activity of a terminal user using the mobile terminal.

In an optional implementation manner, the terminal information may include terminal sensing information and user operation information, where the terminal sensing information includes the position of the mobile terminal.

The processor 1020 may be specifically configured to query a human activity distribution database according to the current time and the position of the mobile terminal, so as to obtain the prior probability information of different types of user activities.

In another optional implementation manner, the processor 1020 may further be configured to acquire human activity information from network information, perform classification statistics on the human activity information to obtain probability information of different user activities at different time and in different positions, and store the probability information as a prior probability of a user activity in the human activity distribution database.

In another optional implementation manner, the network interface 1010 may be further configured to receive activity information of the terminal user, which is reported by the mobile terminal based on a preset time period.

The processor 1020 may be further configured to update the user activity classification model and the user activity forecast model according to the activity information, and deliver the updated user activity classification model and user activity forecast model to the mobile terminal by using the network interface.

It can be seen from the foregoing embodiment that, a mobile terminal collects terminal information that includes a position of the mobile terminal, obtains prior probability information of different types of user activities at current time and in the position from a server, and recognizes or forecasts, according to the prior probability information and the terminal information, an activity of a terminal user using the mobile terminal. In this embodiment of the present invention, during recognition or forecast of a user activity, an activity of a terminal user is recognized or forecasted with reference to not only terminal data of the terminal user but also prior probability information of different types of user activities. During the recognition or the forecast, the number of data samples increases, and therefore accuracy of the recognition or the forecast is improved; in addition, a difference between information that is pushed to the terminal user by applying a recognition or forecast result in this embodiment of the present invention and information in which the user is interested is comparatively small, and therefore terminal using experience of the user can be improved.

A person skilled in the art may clearly understand that technique in the embodiments of the present invention may be implemented in a manner of software and a necessary general hardware platform. Based on such an understanding, the technical solutions of the present invention essentially or the part contributing to the prior art may be implemented in a form of a software product. The software product is stored in a storage medium, such as a ROM/RAM, a hard disk, or an optical disc, and includes several instructions for instructing a computer device (which may be a personal computer, a server, or a network device) to perform the methods described in the embodiments or some parts of the embodiments of the present invention.

Embodiments in the present invention are described in a progressive manner. Same and similar parts in the embodiments can be reference for each other and differences with other embodiments are focused in each embodiment. Particularly, for a system embodiment, it is basically similar with a method embodiment, and therefore description is relatively simple. For correlation, see partial description in the method embodiment.

The foregoing implementation manners in the present invention do not constitute any restriction on the protection scope of the present invention. Any modifications, equivalent replacements, and improvements made within the spirit and principle of the present invention shall fall within the protection scope of the present invention.

What is claimed is:

1. A method for processing user information, comprising:
   collecting, by a mobile terminal, terminal information, wherein the terminal information comprises a position of the mobile terminal;
   obtaining prior probability information of different types of user activities at current time and in the position; and
   recognizing or forecasting, according to the prior probability information and the terminal information, an activity of a terminal user using the mobile terminal;
   wherein recognizing or forecasting, according to the prior probability information and the terminal information, the activity of the terminal user using the mobile terminal comprises:
      inputting the prior probability information and the terminal information to a pre-trained user activity classification model and training the user activity classification model by using a preset algorithm, so as to obtain an activity recognition result of the terminal user; or
      inputting the prior probability information and the terminal information to a pre-trained user activity forecast model and training the user activity forecast model by using a preset algorithm, so as to obtain an activity forecast result of the terminal user.

2. The method according to claim 1, wherein the terminal information comprises: terminal sensing information and user operation information, wherein the terminal sensing information comprises the position of the mobile terminal; and
   collecting, by the mobile terminal, terminal information comprises:
      collecting, by the mobile terminal, the terminal sensing information and the user operation information based on a set time period; or
      collecting, by the mobile terminal, the terminal sensing information and the user operation information when receiving a collect command input by the terminal user.

3. The method according to claim 1, wherein obtaining the prior probability information of different types of user activities at current time and in the position comprises:
   sending, by the mobile terminal, the collected position of the mobile terminal to a server, so that the server queries a human activity distribution database according to the current time and the position, so as to obtain the prior probability information of different types of user activities; and
   receiving the prior probability information of different types of user activities that is returned by the server.

4. The method according to claim 1, wherein the method further comprises:
   reporting, by the mobile terminal based on a preset time period, activity information of the terminal user to the server, so that the server updates the user activity classification model and the user activity forecast model according to the activity information; and
   receiving the updated user activity classification model and user activity forecast model that are returned by the server.

5. A method for processing user information, comprising:
   receiving, by a server, terminal information collected by a mobile terminal, wherein the terminal information comprises a position of the mobile terminal;
   obtaining prior probability information of different types of user activities at current time and in the position;
   sending the prior probability information of different types of user activities to the mobile terminal, so that the mobile terminal recognizes or forecasts, according to the prior probability information and the terminal information, an activity of a terminal user using the mobile terminal;
   receiving, by the server, activity information of the terminal user, which is reported by the mobile terminal based on a preset time period;

updating a user activity classification model and a user activity forecast model according to the activity information; and delivering the updated user activity classification model and user activity forecast model to the mobile terminal.

6. The method according to claim 5, wherein the terminal information comprises: terminal sensing information and user operation information, wherein the terminal sensing information comprises the position of the mobile terminal; and obtaining the prior probability information of different types of user activities at current time and in the position comprises: querying, by the server, a human activity distribution database according to the current time and the position of the mobile terminal, so as to obtain the prior probability information of different types of user activities.

7. The method according to claim 6, wherein the method further comprises:

acquiring, by the server, human activity information from network information;

performing classification statistics on the human activity information, so as to obtain probability information of different user activities at different time and in different positions; and storing the probability information as a prior probability of a user activity in the human activity distribution database.

8. A mobile terminal, comprising: a sensing apparatus, a network interface, and a processor, wherein:

the sensing apparatus is configured to collect terminal sensing information belonging to terminal information, wherein the terminal sensing information comprises a position of the mobile terminal;

the processor is configured to collect user operation information belonging to the terminal information;

the network interface is configured to establish a communication connection with a server and obtain prior probability information of different types of user activities at current time and in the position from the server;

the processor is further configured to recognize or forecast, according to the prior probability information and the terminal information, an activity of a terminal user using the mobile terminal; and the processor is further configured to input the prior probability information and the terminal information to a pre-trained user activity classification model, and train the user activity classification model by using a preset algorithm, so as to obtain an activity recognition result of the terminal user; or input the prior probability information and the terminal information to a pre-trained user activity forecast model, and train the user activity forecast model by using a preset algorithm, so as to obtain an activity forecast result of the terminal user.

9. The mobile terminal according to claim 8, wherein:

the sensing apparatus is configured to collect the terminal sensing information based on a set time period; or collect the terminal sensing information when receiving a collect command input by the terminal user, wherein the terminal sensing information comprises the position of the mobile terminal; and the processor is configured to collect the user operation information based on the preset time period; or collect the user operation information when receiving the collect command input by the terminal user.

10. The mobile terminal according to claim 8, wherein:

the network interface is configured to send the position of the mobile terminal to the server, so that the server queries a human activity distribution database according to the current time and the position, so as to obtain the prior probability information of different types of user activities; and receive the prior probability information of different types of user activities that is returned by the server.

11. The mobile terminal according to claim 8, wherein: the processor is further configured to report activity information of the terminal user to the server based on a preset time period by using the network interface, so that the server updates the user activity classification model and the user activity forecast model according to the activity information; and receive the updated user activity classification model and user activity forecast model that are returned by the server by using the network interface.

12. A server, comprising: a network interface and a processor, wherein:

the network interface is configured to receive terminal information collected by a mobile terminal, wherein the terminal information comprises a position of the mobile terminal;

the processor is configured to obtain prior probability information of different types of user activities at current time and in the position, and send the prior probability information of different types of user activities to the mobile terminal by using the network interface, so that the mobile terminal recognizes or forecasts, according to the prior probability information and the terminal information, an activity of a terminal user using the mobile terminal;

the network interface is further configured to receive activity information of the terminal user, which is reported by the mobile terminal based on a preset time period; and the processor is further configured to update a user activity classification model and a user activity forecast model according to the activity information, and deliver the updated user activity classification model and user activity forecast model to the mobile terminal by using the network interface.

13. The server according to claim 12, wherein the terminal information comprises: terminal sensing information and user operation information, wherein the terminal sensing information comprises the position of the mobile terminal; and the processor is configured to query a human activity distribution database according to the current time and the position of the mobile terminal, so as to obtain the prior probability information of different types of user activities.

14. The server according to claim 13, wherein:

the processor is further configured to acquire human activity information from network information, perform classification statistics on the human activity information to obtain probability information of different user activities at different time and in different positions, and store the probability information as a prior probability of a user activity in the human activity distribution database.

* * * * *